(12) United States Patent
Piescik et al.

(10) Patent No.: US 11,001,041 B2
(45) Date of Patent: May 11, 2021

(54) HEAT-SEALABLE, LIQUID IMPERVIOUS FABRIC

(71) Applicant: Ahlstrom-Munksjö Oyj, Helsinki (FI)

(72) Inventors: Stephen M. Piescik, Somers, CT (US); Vamsi Krishna Jasti, Vernon, CT (US)

(73) Assignee: Ahlstrom-Munksjö Oyj, Helsinki (FI)

( * ) Notice: Subject to any disclaimer, the term of this patent is extended or adjusted under 35 U.S.C. 154(b) by 0 days.

(21) Appl. No.: 16/762,156

(22) PCT Filed: Jul. 17, 2018

(86) PCT No.: PCT/EP2018/069378
§ 371 (c)(1),
(2) Date: May 7, 2020

(87) PCT Pub. No.: WO2019/091607
PCT Pub. Date: May 16, 2019

(65) Prior Publication Data
US 2020/0361190 A1    Nov. 19, 2020

Related U.S. Application Data

(60) Provisional application No. 62/584,865, filed on Nov. 12, 2017.

(51) Int. Cl.
*B32B 27/12* (2006.01)
*B32B 5/02* (2006.01)
(Continued)

(52) U.S. Cl.
CPC .............. *B32B 27/12* (2013.01); *B32B 5/022* (2013.01); *B32B 7/12* (2013.01); *B32B 27/08* (2013.01);
(Continued)

(58) Field of Classification Search
CPC ......... B32B 27/12; B32B 5/022; B32B 27/36; B32B 2307/7265; B32B 2250/24;
(Continued)

(56) References Cited

U.S. PATENT DOCUMENTS 6,187,696 B1 * 2/2001 Lim ........................ B32B 27/12
442/370
6,716,778 B1 * 4/2004 Hottner .................... B32B 5/24
442/199
(Continued)

FOREIGN PATENT DOCUMENTS

JP         200511125 A       8/2000
JP       2004507388 A       8/2000

*Primary Examiner* — Jeremy R Pierce
(74) *Attorney, Agent, or Firm* — Laine IP Oy; Mark W. Scott (57) ABSTRACT

Breathable barrier fabrics for protective garments that form liquid impervious seams when overlapped and sealed together via heat-sealing, and the seams formed thereby. The breathable barrier fabric is a heat-sealable, liquid impervious fabric composed of a breathable, liquid impervious thermoplastic film layer having a first melting point and a nonwoven layer bonded to a first surface of the thermoplastic film layer. The nonwoven layer has a second melting point that is higher than the first melting point of the thermoplastic film layer. A second nonwoven layer having the second melting temperature may be bonded to a second surface of the thermoplastic film layer opposite the first surface such that the inner film layer has a lower melting point than the outer nonwoven layers. The heat-sealable, liquid impervious fabric has a moisture vapor transmission rate of at least 800 $g/m^2/day$ as determined by ASTM E96-00.

17 Claims, 2 Drawing Sheets

(51) Int. Cl.
*B32B 7/12* (2006.01)
*B32B 27/08* (2006.01)

(52) U.S. Cl.
CPC ..... *B32B 2260/021* (2013.01); *B32B 2274/00* (2013.01); *B32B 2307/31* (2013.01); *B32B 2307/724* (2013.01); *B32B 2437/00* (2013.01)

(58) Field of Classification Search
CPC ........ B32B 2255/02; B32B 2262/0253; B32B 2307/724; A41D 31/10; A41D 31/102; Y10T 442/647; Y10T 442/675; Y10T 442/649; Y10T 442/674; Y10T 442/676; Y10T 442/2148
See application file for complete search history.

(56) References Cited

U.S. PATENT DOCUMENTS

| | | | |
|---|---|---|---|
| 2002/0031964 A1* | 3/2002 | Reisdorf | B32B 27/12 442/64 |
| 2002/0106959 A1 | 8/2002 | Huffines et al. | |
| 2004/0094265 A1 | 5/2004 | Palomo et al. | |
| 2006/0052025 A1* | 3/2006 | Dharmadhikary | B32B 27/12 442/398 |
| 2009/0098352 A1* | 4/2009 | Wittmann | B32B 27/12 428/213 |
| 2011/0039468 A1* | 2/2011 | Baldwin, Jr. | B32B 27/12 442/381 |

\* cited by examiner

FIG.4

HEAT-SEALABLE, LIQUID IMPERVIOUS FABRIC

TECHNICAL FIELD

This disclosure relates to breathable barrier fabrics that form liquid impervious seams when overlapped and sealed together via heat-sealing, the seams formed thereby, and related methods of manufacturing and using the same.

BACKGROUND

Protective garments that provide protection to a wearer of the protective garment from the outside environment and/or protection to the outside environment from the wearer of the protective garment are required to be breathable and at the same time to be liquid impervious to provide necessary barrier properties. For example, protective garments used in the medical field, such as gowns, drapes, masks and gloves, can protect the wearer from environmental elements such as blood, bodily fluids and other liquids as well as virus, bacteria and other microbes or micro-organisms carried in liquids. Protective garments used in the medical field and other fields, such as cleanroom apparel, may also provide protection from particulate matter, such as skin, or blood, bodily fluids and other liquids as well as virus, bacteria and other microbes or micro-organisms being released by the wearer into the environment.

As used herein, the term "protective garment" shall be construed broadly to mean all types of garments that provide one or more of the foregoing types of barrier protections and the term "liquid impervious" shall be construed broadly to mean being a barrier to liquids such as blood and other bodily fluids as well as to virus, bacteria and other microbes or micro-organisms carried in liquids. Breathability is the ability of a garment or fabric to allow water vapor to pass through it while preventing liquid from passing through it, and is expressed interchangeably as "moisture vapor transmission rate" (MVTR) or "water vapor transmission rate" (WVTR).

Multi-laminate, breathable, liquid impervious fabrics having desirous properties for use in protective garments and heat-sealing of such fabrics are known. For example, U.S. Pat. No. 7,390,376 to Palomo discloses multi-laminate medical fabrics, such as surgical gowns, having heat-sealed seams with fluid penetration resistance characteristics similar to the multi-laminate base material that do not require additional stitching or adhesive sealing techniques. Palomo's multi-laminate medical fabric structure has three layers—nonwoven fabric/impervious film/nonwoven fabric—where the outer nonwoven fabric layers have a melting temperature that is lower than the melting temperature of the inner impervious film layer. The heat-sealed seam seal is made to be impervious by melting the layers of the outer nonwoven fabric layers when overlapped, and preventing the inner impervious film layer from melting.

There exists a need in the art, however, for multi-laminate fabrics that form heat-sealed seams and methods for making protective garments having heat-sealed seams that utilize lower energy and permit faster sealing times while at the same time exhibiting the same breathability and liquid impervious properties of the multi-laminate fabrics.

SUMMARY

The present disclosure is a directed to multi-laminate, breathable, liquid impervious fabrics that can form liquid impervious seams when overlapped and sealed together via heat-sealing without sacrificing the barrier properties of the multi-laminate, breathable, liquid impervious fabrics, the seams formed thereby, and related methods of manufacturing and using the same. The multi-laminate, breathable, liquid impervious fabrics may be used to manufacture a variety of protective garments, such as medical gowns, drapes, masks, gloves, or other products requiring barrier protections from liquids such as blood and other bodily fluids as well as to virus, bacteria and other microbes or micro-organisms carried in liquids, with lower energy costs and faster sealing times, thus achieving cost and manufacturing efficiencies.

In accordance with a first aspect of the disclosure, a heat-sealable, liquid impervious fabric comprises a breathable, liquid impervious thermoplastic film layer having a first melting point and a nonwoven layer bonded to a first surface of the thermoplastic film layer. The nonwoven layer has a second melting point that is higher than the first melting point of the thermoplastic film layer with the difference between the melting points being less than 15° C. or less than 10° C. A second nonwoven layer having the second melting point or a different melting point may be bonded to a second surface of the thermoplastic film layer opposite the first surface. The thermoplastic film layer is a single layer film or multi-layer film comprising a center core layer of a hydrophilic breathable resin having a first moisture vapor transmission rate (MVTR) and comprising about 70-80% of the weight of the multi-layer film, and outer layers of a second breathable resin having a second MVTR that is less than the first MVTR of the center core layer, each outer layer comprising about 10-15% by weight of the multi-layer film.

The heat-sealable, liquid impervious fabric as disclosed herein is characterized by the following advantageous barrier properties: (a) an overall MVTR of at least 800 g/m$^2$/day as determined by ASTM E96-00, or at least 1,000 g/m$^2$/day, or at least 1,200 g/m$^2$/day, or at least 1,400 g/m$^2$/day; (b) a wet peel strength between the film layer and the nonwoven layer of at least 55 grams per 25 mm; and (c) passing test methods for resistance of the fabric to penetration by synthetic blood and other microbes according to ASTM Test Methods F1670 and F1671.

In accordance with another aspect of the disclosure, a protective garment is constructed from the heat-sealable, liquid impervious fabric to form at least one liquid impervious seam comprising: a first heat-sealable, liquid impervious fabric having a first edge; and a second heat-sealable, liquid impervious fabric having a second edge arranged with and heat-sealed to the first heat-sealable, liquid impervious fabric to form a common seam edge, wherein the nonwoven layer of the first heat-sealable, liquid impervious fabric is sealed to the nonwoven layer of the second heat-sealable, liquid impervious fabric. The seam is breathable and passes standardized tests for synthetic blood and viral penetration, and has a seam seal strength of at least 2 pounds per inch.

A further aspect of the disclosure is a liquid impervious, sealed seam for protective garments. The seam comprises a first portion of the heat-sealable, liquid impervious fabric having a first edge. The heat-sealable, liquid impervious fabric, as set forth above, is composed of a breathable, liquid impervious thermoplastic film layer having a first melting point and a nonwoven layer bonded to a first surface of the thermoplastic film layer, the nonwoven layer having a second melting point that is higher than the first melting point of the thermoplastic film layer. A second portion of the heat-sealable, liquid impervious fabric having a second edge is arranged such that the second edge is heat-sealed to the first edge of the first portion to form a common seam edge, wherein the nonwoven layer of the first portion is sealed to the nonwoven layer of the second portion at the common seam edge.

A still further aspect of the disclosure is a method of making a breathable, liquid impervious seam in a protective garment. In the method, a first portion of a heat-sealable, liquid impervious fabric is formed and, as set forth above, is composed of a breathable, liquid impervious thermoplastic film layer having a first melting point and a nonwoven layer bonded to a first surface of the thermoplastic film layer, the nonwoven layer having a second melting point that is higher than the first melting point of the thermoplastic film layer, and has an overall moisture vapor transmission rate (MVTR) of at least 800 g/m$^2$/day as determined by ASTM E96-00. A second portion of the heat-sealable, liquid impervious fabric is formed. The first portion is overlapped with the second portion to form a common seam edge where the nonwoven layer of the first portion is in contact with the nonwoven layer of the second portion. The common seam edge is then heat-sealed to form a fluid impervious barrier seam having the same liquid impervious barrier properties as the first and second portions of the heat-sealable, liquid impervious fabric. In the method, the heat sealing step does not require high sealing temperatures and can be achieved at sealing temperatures of about 160° C. to about 190° C. and shorter sealing times of about 1 to 3.5 seconds, thus providing manufacturing and cost efficiencies. Any type of heat-sealing apparatus may be used to apply heat and pressure to form the seam, and the method of forming the seam can be incorporated into conventional manufacturing systems and included in seam-forming steps and equipment currently used for production of protective garments other products that can benefit from the formation of a liquid impervious seam. For example, suitable apparatuses include an impulse heater that heats up and cools down for each seam made, or a sealing bar. The process parameters such as temperature and pressure can vary depending on the composition of the layers of the heat-sealable, liquid impervious fabric. For example, sealing temperatures in the range of 160-190° C., preferably in the range of 160° C.-170° C., and pressures in the range of 50-70 pounds per square inch (psi), preferably about 65-70 psi, may be used. The heat and pressure can be applied for a dwell time of 1-3.5 seconds, preferably about 1.3 to 1.7 seconds. In a preferred process, the temperature of the heat-sealing apparatus, for example, the jaw or nip, should be about 70-90° C. after cooling, preferably about 85-90° C. The exact temperatures and pressures will depend upon the nature of the components of the fabric and the dwell time. The seam seal strength may vary dependent on the basis weight of the heat-sealable, liquid impervious fabric. For basis weights of about 70 gsm, the seam seal strength may lie in a range of 3 to 4.6 lbs/inch. For basis weights of about 50 gsm, the seal strength may lie in a range of 2.8 to 3.8 lbs/inch.

This disclosure is also directed to a method of forming a heat-sealable, liquid impervious fabric. In this method, a breathable, liquid impervious thermoplastic film layer having a first melting point is extruded, and a nonwoven layer having a second melting point that is higher than the first melting point of the thermoplastic film layer is bonded to a first surface of the thermoplastic film layer. Alternatively, the nonwoven layer can be formed, and the breathable, liquid impervious thermoplastic film layer can be extruded onto the nonwoven film layer.

Other objects, features, and advantages of the various embodiments in the present disclosure will be explained in the following detailed description with reference to the appended drawings.

DETAILED DESCRIPTION

In the following detailed description and accompanying drawings, various embodiments of a heat-sealable, liquid impervious fabric are described with reference to protective garments, and more particularly to a medical gown, to illustrate the general principles in the present disclosure. It will be recognized by one skilled in the art that the present disclosure may be practiced with any type of protective garment and in other analogous applications or environments and/or with other analogous or equivalent variations of the illustrative embodiments. It should be noted that those methods, procedures, components, or functions which are commonly known to persons of ordinary skill in the field of the disclosure are not described in detail herein.

As used herein, the term "about" in the context of numerical values means that specific values may be modified by +/−10%. As regards endpoints of ranges, the modifier "about" means that the lower endpoint may be reduced by 10% and the upper endpoint may be increased by 10%. It is also contemplated that each numerical value or range disclosed in this application can be absolute, i.e. that the modifier "about" can be deleted.

Figure 1:
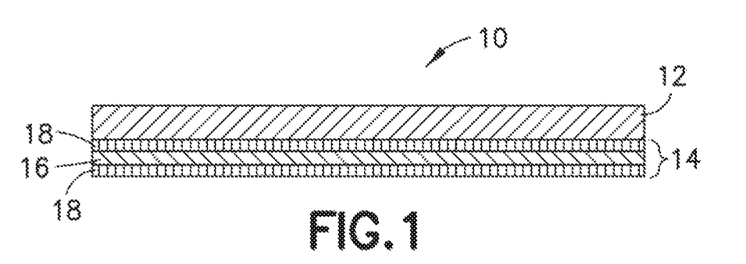
FIG. 1 is a cross-sectional view of a heat-sealable, liquid impervious fabric having a breathable, liquid impervious thermoplastic film layer and a nonwoven layer.
Figure 2:
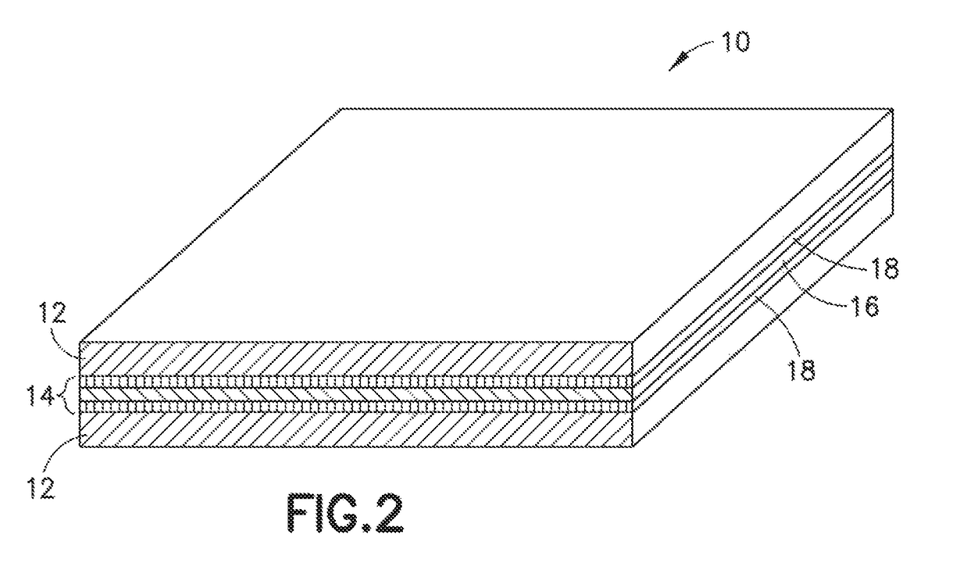
FIG. 2 is a perspective view of a heat-sealable, liquid impervious fabric having a breathable, liquid impervious thermoplastic film layer between two nonwoven layers.

Referring to FIGS. 1 and 2, a heat-sealable, liquid impervious fabric 10 is comprised of at least two layers having different melting points. The term melting point as used herein means a specific temperature or a range of temperatures that induce a material to become a liquid. At least one of the layers in the fabric 10 is a nonwoven layer 12; and at least one of the layers in the fabric 10 is a breathable, liquid impervious thermoplastic film layer 14. The film layer 14 has a first melting point; and the nonwoven layer 12 has a second melting point that is higher than the first melting point of the film layer 14. The difference between the melting points in the nonwoven layer 12 and the film layer 14 should not be that great, preferably less than 15° C. or, more preferably, less than 10° C. so that all of the layers in the heat-sealable, liquid impervious fabric 10 can melt together. FIG. 2 shows a heat-sealable, liquid impervious fabric 10 having a second nonwoven layer 12 with the film layer 14 sandwiched between the first and second nonwoven layers 12. The second nonwoven layer 12 may be similarly composed as the first nonwoven layer 12, or it may have a different composition depending on the end use application.

The nonwoven layer 12 and the film layer 14 are bonded together with an adhesive suitable for use with heat-sealable, liquid impervious fabric 10 of the type disclosed herein. For example, a hot-melt pressure sensitive adhesive such as a styrene-isoprene-styrene (SIS) rubber with hydrogenated hydrocarbon which can be processed with equipment for fabricating thermoplastic polymers. Examples of such an adhesive are SAVARE CB710 available from Savaré Specialty Adhesives, Milan, Italy and HBFuller 1023 available from H.B. Fuller Company, St. Paul, Minn. The adhesive can be applied or coated onto one surface or both surfaces of the film layer 14 or onto the surface of the nonwoven layer 12 that will be bonded to the film layer 14 by any means know in the art. The adhesive has a melting point in the range of about 140° C. to about 160° C.

The nonwoven layer 12 can be composed of any material suitable for the desired end use, preferably for a protective garment. Suitable materials for use in the nonwoven layer 12 include, but are not limited to, nonwoven materials such as a spun melt (e.g. spun melt polyethylene, polypropylene and co-polymers thereof), spunbond polypropylene and spunbond bicomponent fibers comprising polyethylene, polypropylene and co-polymers thereof, carded spun-laced or spun-melt polyester, and meltblown polypropylene and meltblown bicomponent fibers comprising polyethylene, polypropylene and co-polymers thereof, or combinations thereof, for example in a spunbond-meltblown-spunbond (SMS) configuration. In the exemplary embodiments disclosed, the nonwoven layer 12 comprises polypropylene for its hydrophobic properties and has a melting point in the range of about 136° C. to 165° C. The nonwoven layer 12 provides structural support to and protection of the film layer 14, and the surface of the nonwoven layer 12 can be glazed to reduce linting. The glazing may, for example, be done in accordance with the methods described in co-owned U.S. Pat. No. 9,290,877 to Shah (the '877 patent). This is explained in the following, although the disclosure is not limited to any of these steps (they represent only one amongst several options that the skilled person could use to carry the glazing process). The glazing process forms an outer glazed surface (e.g., where the thermoplastic bicomponent fibers are at least partially flattened) that reduces lint generation or the particle shedding count of the breathable barrier fabric. The term "glazed" surface as used herein and similar expressions define a surface that is obtained by applying heat and pressure to said surface. Without wishing to be bound by any theory, it is believed that the glazing treatment of the outer surface of the respective layer results in melting and subsequent resolidification of the outer region of the layer. Heat and pressure can be applied by the circumferential surface of a heater smooth roll on that portion of the surface of the layer that is in contact with the heater roll, such as described in column 6, lines 19-30 of U.S. Pat. No. 9,290,877 (the '877 patent). The pressure can be altered by adjusting the relative speeds of the machine and glazing rolls shown in FIG. 2 of the '877 patent. The surface temperature of the heated smooth roll can be in a range of 290 to 330° F. (143.3-165° C.), preferably 300 to 330° F. (148.9-169.5° C.), depending on the melting point of the polymer used in the spunbond layers. Preferably, the glazed surface is obtained by heating the outer surface of an outer spunbond layers to the melting temperature of thermoplastic bicomponent fibers or to the melting temperature of those parts of thermoplastic bicomponent fibers that come into contact with the heater smooth roll or similar glazing equipment.

The film layer 14 may be a single or multiple layer monolithic breathable film. In any of the disclosed exemplary embodiments, the film layer 14 is a multi-layer monolithic breathable film having at least a three-layer construction consisting of a center core layer 16 comprising a hydrophilic breathable resin sandwiched between outer layers 18 comprising a breathable resin that is more hydrophobic (or less hydrophilic, and therefore less breathable) than the resin in the center core layer 16. The center core layer 16 has a moisture vapor transmission rate (MVTR) that is greater than the MVTR of the outer layers 18 of the film layer 14. The outer layers 18 may be composed of the same resin to form an A-B-A construction or may be composed of different resins to form an A-B-C construction. In exemplary constructions of the film layer 14, the center core layer 16 comprises about 70-80% of the weight of the film layer 14 and the outer layers 18 comprise about 10-15% of the weight of the film layer 14. For example, the A-B-A or A-B-C structure of the film layer 14 can have weight percentage distributions of its layers as follows: 10-80-10, or 15-70-15, or 12.5-75-12.5. The film layer 14 should be thin, for example, between about 0.333 mil and 0.666 mil, preferably about 0.5 mil.

The film layer 14 can be made from any material that is breathable, liquid impervious, forms a monolithic film, and has the desired melting points for use in the heat-sealable, liquid impervious fabric 10 disclosed herein, preferably melting points lower than the melting point of the nonwoven layer 12. It has been determined, surprisingly, that resins which have typically been used for injection molding applications, can be formed into thin films suitable for use in the film layer 14 of the heat-sealable, liquid impervious fabric 10, which melt at a lower temperature than the nonwoven layer 12 and still provide the desired liquid impervious barrier properties. For example, one or more HYTREL® breathable polymers (polyether block amides) available from DuPont de Nemours Co., Wilmington, Del. For example, the film layer 14 may be composed of HYTREL® G3548 resin by itself or HYTREL® G3548 resin may be used as the center core layer 16 and HYTREL® 4056 resin may be used for the outer layers 18. These resins have melting temperatures of 150° C. (G4056) and 156° C. (G3548), resulting in a film layer 14 that has a melting temperature of about 156° C. The higher melting point HYTREL® G3548 resin in the center core layer 16 has a MVTR of 2140 $g/m^2/day$. The lower melting point HYTREL® G4056 resin in the outer layers 18 has a MVTR of 440 $g/m^2/day$. Thus, the outer layers 18 of the film layer 14 are less breathable and more hydrophobic than the center core layer 16 of the film layer 14. This construction allows for the film layer 14 to sufficiently adhere to the nonwoven layer 12 adjacent to it while in a wet state as would be seen in actual use, yet retain its breathability. The term "monolithic film", as used in this context, may be understood to refer, e.g., to a nonporous solid polymer membrane which allows the passage of water vapor because of its hydrophilic properties.

When constructing the heat sealable, liquid impervious fabric 10, the resins in the film layer 14 may be extruded all at the same time and bonded to a surface of the nonwoven layer 12 in a single step process, or the nonwoven layer 12 may be laid down on the film layer 14 after it is extruded, using any methods known in the art. In exemplary embodiments, the total basis weight of the heat sealable, liquid impervious fabric 10 is between about 47-77 grams per square meter (gsm). The basis weight was measured according to ASTM D 3776. A first nonwoven layer 12 has a basis weight of about 23-29 gsm, the film layer 14 has a basis weight of about 10-18 gsm, a second nonwoven layer 12 has a basis weight of about 12-23 gsm, and the layers are bonded together with an adhesive having a weight of about 0.5-3 gsm, split between the first nonwoven layer 12 and film layer 14, and between the second nonwoven layer 12 and the film layer 14. The adhesive does not have to be split equally. The first nonwoven layer 12 may be used to form an outer layer of a protective garment, and the second nonwoven layer 12 may be used to form an inner layer of a protective garment.

Heat sealable, liquid impervious fabrics 10 as disclosed herein have zero pinholes, are breathable and liquid impervious, passing standardized tests for synthetic blood penetration (ASTM F1670) and viral penetration (ASTM F1671), therefore qualifying for AAMI4 ratings for blood and viral barriers, and are characterized by the additional advantageous properties for forming heat seals in protective garments shown in Table I:

TABLE I

| Properties | Test Method | Units | Range |
| --- | --- | --- | --- |
| Hydro Head (No Screen) | AATCC 127-2003 | cm | 174-238 |
| MVTR | ASTM E96-00 | g/m$^2$/24 hrs | 1279-1754 |
| Wet Peel Strength (inner) | ASTM 904-96 (modified) | g/25 mm | 55-272 |
| Wet Peel Strength (outer) | ASTM 904-96 (modified) | g/25 mm | 100-337 |

The Hydro Head property was measured with Water Resistance: Hydrostatic Pressure test AATCC 127-2003 with no changes. This test method measures the resistance of a fabric to the penetration of water under hydrostatic pressure. It is applicable to all types of fabrics irrespective of the treatments applied to its surface. The principle behind this test method is that the surface of a test fabric is subjected to hydrostatic pressure, increasing at a constant rate, until three points of leakage appear on its surface. The outer side of the test fabric is exposed to testing with a Textest FX3000 Hydrostatic Head tester. This instrument uses an electronically controlled pump to apply Hydrostatic pressure at 60 mbar/min to the test fabric. The test fabric samples were handled cautiously to avoid any folding or contamination. The samples were conditioned at 21±2° C. and 65±2% RH for at least 4 hours before testing. The surface of the test specimen that is exposed to water must be specified. Make sure, the water in contact with the test specimen is regulated at 21±2° C. The test fabric samples are cut into the size 20×20 centimeters to allow proper clamping. The clamping surface has to be dry before the test fabric samples are clamped. Clamp the test fabric with the surface to be tested facing the water. Select the rate of 60 mbar/min and press the start button. Disregard the water droplets that appear within approximately 3 mm adjacent to the edge of the clamping ring. Record the Hydrostatic pressure at the moment water droplets penetrates the fabric at three different places.

The moisture vapor transmission rate (MVTR), also known as water vapor transmission rate (WVTR) is used to describe the breathability of the heat-sealable, liquid impervious fabric 10 and was measured according to ASTM E96-00. Following this standard, circular nonwoven samples of 4.125" (10.5 cm) diameter were evaluated. Samples were individually placed over 80×40 mm evaporating dishes filled with 100 mL of distilled water and then taped to the sides of the dish. The evaporating dish along with the sample and the distilled water was weighed (initial weight). The dish was then placed in a controlled environment (73.4±1.8° F./23±1° C., 50±2% RH %) for 24 hours. After 24 hours, the dish, sample and remaining water was re-weighed (final weight) and the difference calculated. For a standard 24-hour interval, the moisture loss was divided by the area of the sample tested (0.00312 square meters).

The wet peel strength of the heat sealable, liquid impervious fabric 10 is the measurement of adhesion between the nonwoven layer 12 and the film layer 14, and is measured as the amount of tensile force required to separate the nonwoven layer 12 and film layer 14 apart. The peel strength is measured using ASTM 904-96 test method with minor changes. It uses a Zwick tensile tester (Model z 2.5, Zwick USA LP, Kennesaw, Atlanta, Ga.), and reports the force required to separate component layers of a laminate. The peel strength is measured using a specified width of the fabric, (2" for this study), and pulled at a constant rate of extension. The 2"×6" specimen is selected randomly from the laminated samples. The laminated samples are then soaked in distilled water for 30 seconds. Then, the legs of the test specimen are clamped in parallel jaws of a tensile testing machine. The separation of the jaws is increased continuously to apply a force to peel the 2 layers apart. The layers are separated manually for a distance of about 2" and then mounted in the jaws. The crosshead speed is 12 in. The average force (in grams per 25 millimeters) to de-laminate is recorded as the peel strength.

The blood and viral barrier properties of the heat sealable, liquid impervious fabric 10 were measured with ASTM F1670 and ASTM F1671 test methods, ASTM F1670 Standard Test Method for Resistance of Materials used in Protective clothing to penetration by Synthetic Blood is a test method used to evaluate the resistance of a material to penetration by synthetic blood (a body fluid stimulant) under conditions of continuous contact. The result will be either a pass of fail based on the visual inspection of synthetic blood penetration. In the test, square shaped specimens of 3 inches on each side are taken randomly from the test fabric. The apparatus consists of a penetration test cell, which has a cell body and flange cover connected to a cell support. The cell body is placed on the bottom side and is connected to the cell support and a pipe. Synthetic blood is applied through the pipe. The fabric sample is placed between the cell body and the flange cover, so that it separates the cell body and flange cover and makes a partition. The flange is covered by a transparent cover, and if the fluid passes through the fabric, it can be visible by the person who is testing. The cell is placed horizontally on a lab bench; the specimen is inserted in the penetration cell with the testing side of the fabric toward the cell body, which will be filled with synthetic blood. The components of the cell are assembled and the bolts are torqued in the test cell to 13.6 N-m. The penetration cell will be placed in the test apparatus in vertical position. Later, the penetration cell chamber will be filled with 60 mL of synthetic blood. No screen was used when this test was performed. Observe for the blood penetration through the fabric for 5 minutes. If there is no Leakage, then an air line is connected to the penetration cell and a 13.8 kPs/s pressure is applied and held for one minute. Any leakage is observed. Turn of the pressure and if leakage is not visible at this point, observe the specimen for again for additional 54 minutes. If no leakage was observed during this time period, then the sample is passed for testing. If any leakage of the fluid through the sample was observed during this testing, the test will be stopped and the sample is failed for the synthetic blood penetration testing.

ASTM F1671 Standard Test Method for Resistance of Materials used in Protective Clothing to Penetration by Blood-Borne Pathogens Using Phi-X174 Bacteriophage penetration as a Test System is similar to the ASTM F1670 except the medium used is Phi-X174 Bacteriophage, instead of synthetic blood.

Pinhole Count Testing is completed with a wide sample of about 2-3 square meters fabric is spread on a table. A solution of colored alcohol is spread across the sample using a foam pad. If a pinhole is present, the colored alcohol solution will pass through the film at the pinhole, and will stain the underside of the sample. The number of pinholes present (as determined by the number of colored alcohol stains on the underside) is counted, and after measuring the sample dimensions, the number of pinholes per square foot is calculated and reported.

The following examples illustrate the improved properties of a heat sealable, liquid impervious fabric 10 having a film layer 14 sandwiched between two nonwoven layers 12.

Examples A and B

The heat sealable, liquid impervious fabrics 10 shown in examples A and B both include nonwoven layers 12 comprising spunbond polypropylene and having a melting point of about 165° C. The film layer 14 comprises a single layer of HYTREL® G3548 having a melting point of about 156° C., lower than the melting point of the nonwoven layers 12, and has a MVTR of 2140 grams per square meter per day (24 hours). In both examples A and B, the first nonwoven layer 12 that will form an outer surface of the protective garment 20 (shown in FIG. 3) has a basis weight of 28 grams per square meter and the second nonwoven layer 12 that will form an inner surface of the protective garment 20 has a basis weight of 18 grams per square meter. The film layer 14 in example A has a basis weight of 12 grams per square meter and the film layer 14 in example B has a basis weight of 10 grams per square meter. The adhesive used to bond the layers together in both examples has a weight of 2 grams per square meter. Both examples passed the synthetic blood penetration and viral penetration tests (ASTM F1670 and ASTM F1671) and had no pinholes. Table II shows the properties of Examples A and B.

TABLE II

| Properties | Test Method | Units | A | B |
|---|---|---|---|---|
| Basis Weight | ASTM D 3776 | gsm | 60.8 | 59.0 |
| Hydro Head (No Screen) | AATCC 127-2003 | cm | 231 | 238 |
| MVTR | ASTM E96-00 | g/m²/24 hrs | 1728 | 1754 |
| Wet Peel Strength (inner) | ASTM 904-96 (modified) | g/25 mm | 126 | 193 |
| Wet Peel Strength (outer) | ASTM 904-96 (modified) | g/25 mm | 141 | 124 |

Examples C and D

The heat sealable, liquid impervious fabrics 10 shown in examples C and D both include nonwoven layers 12 comprising spunbond polypropylene and having a melting point of about 165° C. The film layer 14 comprises a center core layer 16 of HYTREL® G5348 having a melting point of about 156° C. and MVTR of 2140 grams per square meter per day (24 hours) and two outer layers 18 of HYTREL® G4056 having a melting point of about 150 and MVTR of 440 grams per square meter per day. All layers of the film layer 14 have a melting point lower than the melting point of the nonwoven layers 12. A blue pigment was added to the film layer 14 in these examples for aesthetic purposes, which does not affect the properties of the fabrics. In both examples C and D, the first nonwoven layer 12 that will form an outer surface of the protective garment 20 (shown in FIG. 3) has a basis weight of 29 grams per square meter and the second nonwoven layer 12 that will form an inner surface of the protective garment 20 has a basis weight of 23 grams per square meter. The film layer 14 in example C has a basis weight of 18 grams per square meter and the film layer 14 in example D has a basis weight of 15 grams per square meter. The adhesive used to bond the layers together in both of these examples has a weight of 3 grams per square meter. Both examples C and D passed the synthetic blood penetration and viral penetration tests (ASTM F1670 and ASTM F1671) and had no pinholes. Table III shows the properties of Examples C and D.

TABLE III

| Properties | Test Method | Units | C | D |
|---|---|---|---|---|
| Basis Weight | ASTM D 3776 | gsm | 77.1 | 69.9 |
| Hydro Head (No Screen) | AATCC 127-2003 | cm | 223 | 174 |
| MVTR | ASTM E96-00 | g/m²/24 hrs | 1297 | 1369 |
| Wet Peel Strength (inner) | ASTM 904-96 (modified) | g/25 mm | 72 | 73 |
| Wet Peel Strength (outer) | ASTM 904-96 (modified) | g/25 mm | 187 | 285 |

Example E

The heat sealable, liquid impervious fabric 10 shown in example E includes nonwoven layers 12 comprising spunbond bicomponent fibers having a melting point of about 136° C. The film layer 14 comprises a center core layer 16 of HYTREL® G3548 having a melting point of about 156° C. and MVTR of 2140 grams per square meter per day (24 hours) and two outer layers 18 of HYTREL® G4056 having a melting point of about 150 and MVTR of 440 grams per square meter per day. All layers of the film layer 14 have a melting point lower than the melting point of the nonwoven layers 12. A blue pigment was added to the film layer 14 in these examples for aesthetic purposes, which does not affect the properties of the fabrics. The first nonwoven layer 12 that will form an outer surface of the protective garment 20 (shown in FIG. 3) has a basis weight of 28 grams per square meter and the second nonwoven layer 12 that will form an inner surface of the protective garment 20 has a basis weight of 20 grams per square meter. The film layer 14 in has a basis weight of 15 grams per square meter. The adhesive used to bond the layers together in this example has a weight of 3 grams per square meter. This example passed the synthetic blood penetration and viral penetration tests (ASTM F1670 and ASTM F1671) and had no pinholes. Table IV shows the properties of Examples E.

TABLE IV

| Properties | Test Method | Units | E |
|---|---|---|---|
| Basis Weight | ASTM D 3776 | gsm | 73.5 |
| Hydro Head (No Screen) | AATCC 127-2003 | cm | 191 |
| MVTR | ASTM E96-00 | g/m²/24 hrs | 1279 |
| Wet Peel Strength (inner) | ASTM 904-96 (modified) | g/25 mm | 61 |
| Wet Peel Strength (outer) | ASTM 904-96 (modified) | g/25 mm | 160 |

Examples F and G

The heat sealable, liquid impervious fabrics 10 shown in examples F and G both include nonwoven layers 12 comprising spunbond-meltblown-spunbond polypropylene having a melting point of about 165° C. The film layer 14 comprises a center core layer 16 of HYTREL® G3548 having a melting point of about 156° C. and MVTR of 2140 grams per square meter per day (24 hours) and two outer layers 18 of HYTREL® G4056 having a melting point of about 150 and MVTR of 440 grams per square meter per day. All layers of the film layer 14 have a melting point lower than the melting point of the nonwoven layers 12. A blue pigment was added to the film layer 14 in these examples for aesthetic purposes, which does not affect the properties of the fabrics. In both examples F and G, the first nonwoven layer 12 that will form an outer surface of the protective garment 20 (shown in FIG. 3) has a basis weight of 23 grams per square meter and the second nonwoven layer 12 that will form an inner surface of the protective garment 20 has a basis weight of 12 grams per square meter. The film layer 14 in example F has a basis weight of 15.5 grams per square meter and the film layer 14 in example G has a basis weight of 13.5 grams per square meter. The adhesive used to bond the layers together in both of these examples has a weight of 3 grams per square meter. Both examples F and G passed the synthetic blood penetration and viral penetration tests (ASTM F1670 and ASTM F1671) and had no pinholes. Table V shows the properties of Examples F and G.

TABLE V

| Properties | Test Method | Units | F | G |
|---|---|---|---|---|
| Basis Weight | ASTM D 3776 | gsm | 53 | 50.8 |
| Hydro Head (No Screen) | AATCC 127-2003 | cm | >200 | >200 |
| MVTR | ASTM E96-00 | g/m²/24 hrs | 1358 | 1427 |
| Wet Peel Strength (inner) | ASTM 904-96 (modified) | g/25 mm | 235 | 272 |
| Wet Peel Strength (outer) | ASTM 904-96 (modified) | g/25 mm | 246 | 337 |

Figure 3:
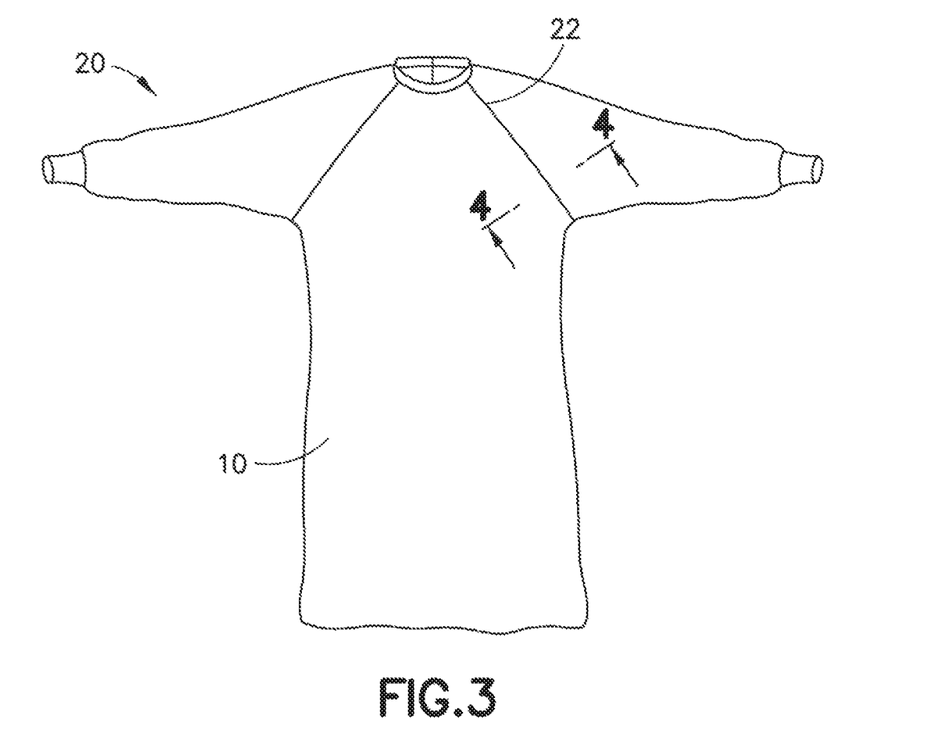
FIG. 3 is an illustration of a protective garment that may be formed by the heat-sealable, liquid impervious fabric.
Figure 4:
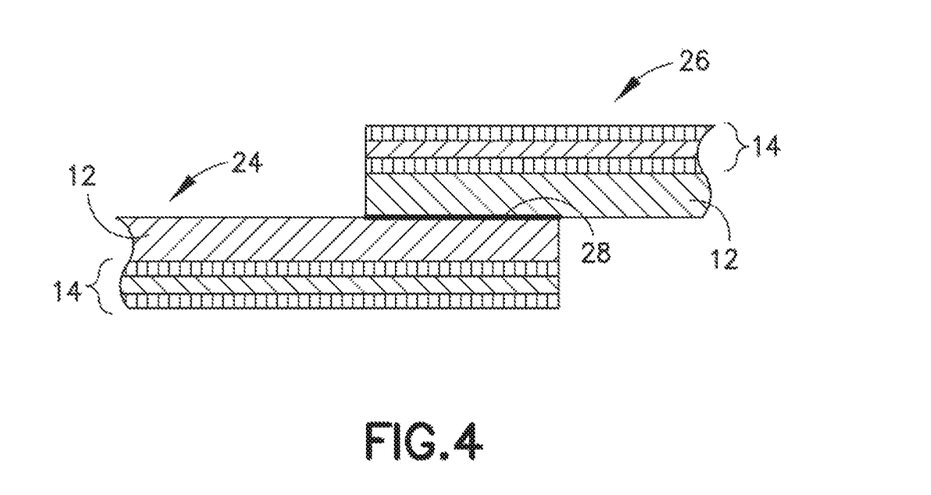
FIG. 4 is partial, enlarged, cross-sectional view of an exemplary embodiment of a liquid impervious seal in a protective garment taken along the line 4-4 in FIG. 3.

Referring to FIGS. 3 and 4, the heat sealable, liquid impervious fabric 10 disclosed herein can be used to form a protective garment 20 having at least one heat-sealed seam 22 that exhibits the same liquid impervious barrier properties as the fabric 10, but uses less energy and time that prior fabrics. The figures show an exemplary medical gown, which is not limiting, as the disclosure may be applied to any type of protective garment 20. To maintain the liquid impervious barrier properties of the heat sealable, liquid impervious fabric 10 when the seam is sealed, a continuous seal along the entire length of the seam is preferred. The dimensions of the seam 22 can vary according to the dimensions of the sealing apparatus and the size and shape of the protective garment 20. Any type of heat-sealing apparatus may be used to apply heat and pressure to form the seam 22, and the method of forming the seam 22 can be incorporated into conventional manufacturing systems and included in seam-forming steps and equipment currently used for production of protective garments other products that can benefit from the formation of a liquid impervious seam. For example, suitable apparatus include an impulse heater that heats up and cools down for each seam made, ultrasonic welding apparatus, or a sealing bar. The process parameters such as temperature and pressure can vary depending on the composition of the layers of the heat-sealable, liquid impervious fabric 10. For example, sealing temperatures in the range of 160-190° C., preferably in the range of 160° C.-170° C., and pressures in the range of 50-70 pounds per square inch (psi), preferably 65-70 psi, may be used. The heat and pressure can be applied for a dwell time of 1-3.5 seconds, preferably 1.3-1.7 seconds. In a preferred process, the temperature of the heat-sealing apparatus, for example, the jaw or nip, should be about 70-90° C. after cooling, preferably 85-90° C. The exact temperatures and pressures will depend upon the nature of the components of the fabric 10 and the dwell time.

The seam 22 is formed by overlapping a first portion 24 of the heat-sealable, liquid impervious fabric 10 with a second portion 26 of the heat-sealable, liquid impervious fabric 10 to form an overlapped region 28 wherein the higher melting point nonwoven layers 12 (as compared to the film layer 14) in each of the first portion 24 and second portion 26 directly contact each other at the overlapped region during the sealing process. The overlapped region 28 may be a partial overlap as shown in FIG. 4 (although the disclosure is not limited thereto, a seam may be formed by folding the fabric on itself such that the edges are aligned or such that they overlap), or the first and second portions may be completely overlapped, one edge of the portions can be sealed, and then the first portion 24 and second portion 26 may be folded about the sealed seam to open up the portions and form the seam 22 in the protective garment 20. In the examples that have two nonwoven layers 12, at each seam 22, the nonwoven layer 12 that forms the outer surface of the protective garment 20 on the first portion 24 directly contacts the nonwoven layer 12 that forms the inner surface of the protective garment on the second portion 26, as shown in FIG. 4. Alternatively, if the portions are completely overlapped, the nonwoven layers 12 that form the outer surface of the protective garment 20 directly contact each other. Upon application of heat to the overlapped region 28 at temperatures at or above the melting point of the nonwoven layers 12, and therefore above the melting point of the film layer 14, all of the layers will melt together to form the seam 22, which maintain the breathable and liquid impervious barrier properties of the heat-sealed, liquid impervious fabric 10.

Each of the examples disclosed herein form seams 22 that pass the synthetic blood penetration and viral penetration tests (ASTM F1670 and ASTM F1671), and have a seam seal strength of greater than 2 lbs/inch. Seam seal strength varies depending on the basis weight of the heat-sealable, liquid impervious fabric 10. For example, for basis weights of about 70 gsm, the seam seal strength varied from 3-4.6 lbs/inch. For basis weights of about 50 gsm, the seal seal strength varied from 2.8-3.8 lbs/inch. Processing parameters and resulting properties of seams 22 formed by the heat-sealable, liquid impervious fabrics 10 of Examples C-G are shown in Table VI.

TABLE VI

| Processing Parameters/ Properties | Units | C | D | E | F | G |
|---|---|---|---|---|---|---|
| Sealing Temperature | ° C. | 175 | 175 | 170 | 165 | 165 |
| Sealing Pressure | psi | 70 | 70 | 80 | 70 | 70 |
| Sealing Time | seconds | 1.5 | 1.5 | 1 | 1.5 | 1.5 |
| Seam Seal Strength (modified ASTM D1683) | lbs/inch | 3.77 | 3.87 | 5.58 | 3.31 | 3.04 |

The seam seal strength of the seam 22 formed by heat-sealing two edge portions of the heat sealable, liquid impervious fabric 10 was measured with a test that was slightly modified from ASTM D1683, Standard Test Method for Failure in Sewn Seams of Woven Apparel Fabrics. A standard Zwick tensile tester (Model z 2.5, Zwick USA LP (Kennesaw, Atlanta, Ga.) was used for this testing. A rectangular sample of 1"×6" (1" wide and 6" length) is taken with the seam 22 placed in the middle of the sample. Adjust the distance between the clamps of the machine at 1". Clamp the sample at the edges such that the gauge length is 1". Once the fabric is placed between the two jaws, the jaws are separated at Constant rate of Elongation, at the rate of 12"/min. Make sure there is no clamp slippage occurs. The force to break the sample is reported in lbs/inch.

Many other modifications and variations may of course be devised given the above description of various embodiments for implementing the principles in the present disclosure. It is intended that all such modifications and variations be considered as within the spirit and scope of this disclosure, as defined in the following claims.

The invention claimed is:

1. A heat-sealable, liquid impervious fabric, comprising: a breathable, liquid impervious thermoplastic film layer having a first melting point; and a nonwoven layer bonded directly to and/or adjacent with a first surface of the thermoplastic film layer, the nonwoven layer having a second melting point that is higher than the first melting point of the thermoplastic film layer; the heat-sealable, liquid impervious fabric having an overall moisture vapor transmission rate (MVTR) of at least 800 g/m$^2$/day as determined by ASTM E96-00, wherein a difference between the first melting point and the second melting point is less than 15° C.

2. The fabric of claim 1, wherein the difference between the first melting point and the second melting point is less than 10° C.

3. The fabric of claim 1, wherein the thermoplastic film layer is a multi-layer film comprising a center core layer of a hydrophilic breathable resin having a first MVTR and outer layers of a second breathable resin having a second MVTR that is less than the first MVTR of the center core layer.

4. The fabric of claim 3, wherein the center core layer comprises about 70-80% of the weight of the multi-layer film and each of the outer layers comprises about 10-15% by weight of the multi-layer film.

5. The fabric of claim 1, further comprising a second nonwoven layer having the second melting point bonded to a second surface of the thermoplastic film layer such that the thermoplastic film layer is between the nonwoven layers.

6. The fabric of claim 1, wherein the overall MVTR is at least at least 1,000 g/m2/day as determined by ASTM E96-00.

7. The fabric of claim 1, wherein the fabric has a wet peel strength between the film layer and the nonwoven layer of at least 55 grams per 25 mm.

8. The fabric of claim 1, wherein the fabric passes test methods for resistance of the fabric to penetration by synthetic blood according to ASTM Test Methods F 1670 and F 1671.

9. A protective garment constructed from the heat-sealable, liquid impervious fabric of claim 1.

10. The protective garment of claim 9, wherein the protective garment comprises at least one liquid impervious seam, the liquid impervious seam comprising: a first heat-sealable, liquid impervious fabric having a first edge; and a second heat-sealable, liquid impervious fabric having a second edge arranged with and heat-sealed to the first heat-sealable, liquid impervious fabric to form a common seam edge, wherein the nonwoven layer of the first heat-sealable, liquid impervious fabric is sealed to the nonwoven layer of the second heat-sealable, liquid impervious fabric.

11. A liquid impervious, sealed seam for protective garments, the seam comprising: a first portion of a heat-sealable, liquid impervious fabric composed of a breathable, liquid impervious thermoplastic film layer having a first melting point and a nonwoven layer bonded directly to and/or adjacent with a first surface of the thermoplastic film layer, the nonwoven layer having a second melting point that is higher than the first melting point of the thermoplastic film layer, the heat-sealable, liquid impervious fabric having an overall moisture vapor transmission rate (MVTR) of at least 800 g/m$^2$/day as determined by ASTM E96-00, the first portion having a first edge; and a second portion of the heat-sealable, liquid impervious fabric having a second edge arranged with and heat-sealed to the first edge of the first portion to form a common seam edge, wherein the nonwoven layer of the first portion is sealed to the nonwoven layer of the second portion at the common seam edge, wherein a difference between the first melting point and the second melting point is less than 15° C.

12. The liquid impervious sealed seam of claim 11, wherein the thermoplastic film layer in the heat-sealable, liquid impervious fabric is a multi-layer film comprising a center core layer of a hydrophilic breathable resin having a first MVTR and outer layers of a second breathable resin having a second MVTR that is less than the first MVTR of the center core layer.

13. The liquid impervious sealed seam of claim 12, wherein the center core layer comprises about 70-80% of the weight of the multi-layer film and each of the outer layers comprises about 10-15% by weight of the multi-layer film.

14. A method of making a breathable, liquid impervious seam in a protective garment, comprising the steps of: forming a first portion of a heat-sealable, liquid impervious fabric composed of a breathable, liquid impervious thermoplastic film layer having a first melting point and a nonwoven layer bonded directly to and/or adjacent with a first surface of the thermoplastic film layer, the nonwoven layer having a second melting point that is higher than the first melting point of the thermoplastic film layer, the heat-sealable, liquid impervious fabric having an overall moisture vapor transmission rate (MVTR) of at least 800 g/m$^2$/day as determined by ASTM E96-00, the first portion having a first edge; forming a second portion of the heat-sealable, liquid impervious fabric having a second edge; overlapping the first portion and the second portion of the heat-sealable, liquid impervious fabric to form a common seam edge where the nonwoven layer of the first portion is in contact with the nonwoven layer of the second portion; and heat sealing the common seam edge; wherein the forming steps further comprise providing a difference between the first melting point and the second melting point is less than 15° C.

15. The method of claim 14, further comprising forming the thermoplastic film layer as a multi-layer film comprising a center core layer of a hydrophilic breathable resin having a first MVTR and outer layers of a second breathable resin having a second MVTR that is less than the first MVTR of the center core layer.

16. The method of claim 15, wherein the center core layer comprises about 70-80%) of the weight of the multi-layer film and each of the outer layers comprises about 10-15%) by weight of the multi-layer film.

17. The method of claim 14, wherein the heat sealing step seals the common seam edge at sealing temperatures of 160 to 190° C.

* * * * *